United States Patent
Mott et al.

[11] 3,900,259
[45] Aug. 19, 1975

[54] TIME INTERVAL PHASE DETECTION IN DISTANCE MEASURING APPARATUS

[75] Inventors: Claude M. Mott; Richard J. Clark, both of Loveland, Colo.

[73] Assignee: Hewlett-Packard Company, Palo Alto, Calif.

[22] Filed: May 9, 1973

[21] Appl. No.: 358,771

[52] U.S. Cl. ................................ 356/5; 343/12 R
[51] Int. Cl. .............................................. G01c 3/08
[58] Field of Search ...................... 356/5; 343/12 R

[56] References Cited
UNITED STATES PATENTS

| | | | |
|---|---|---|---|
| 3,619,058 | 11/1971 | Hewlett et al. | 356/5 |
| 3,690,767 | 9/1972 | Missio et al. | 356/141 |
| 3,740,141 | 6/1973 | DeWitt, Jr. | 356/5 |
| 3,778,159 | 12/1973 | Hines et al. | 356/5 |
| 3,787,118 | 1/1974 | Nowicki et al. | 356/5 |

OTHER PUBLICATIONS

Nakazawa, "Japan Electronic Engineering," 7-1971, pp. 30-36.

*Primary Examiner*—Maynard R. Wilbur
*Assistant Examiner*—S. C. Buczinski
*Attorney, Agent, or Firm*—William E. Hein

[57] ABSTRACT

The phase difference between a modulated light signal transmitted to and reflected back from a distant target and that of a signal transmitted through an internal reference path is determined by digital time interval means to automatically provide a direct indication of distance to the target.

4 Claims, 9 Drawing Figures

TIME INTERVAL PHASE DETECTION IN DISTANCE MEASURING APPARATUS

REFERENCE TO RELATED APPLICATION

This application is related to the subject matter of U.S. Pat. No. 3,619,058, entitled DISTANCE MEASURING APPARATUS and issued Nov. 9, 1971, to William R. Hewlett and Gregory Justice.

BACKGROUND AND SUMMARY OF THE INVENTION

Electronic distance measuring instruments constructed according to the prior art, such as the one described in the reference above, transmit a modulated light carrier signal to a distant reflective target. The phase of a modulated light signal reflected back from the target is then compared with the phase of an internal reference signal to provide a direct readout of the target distance. The phase comparison circuitry employed in these instruments has generally involved analog phase memory loops, as illustrated in FIGS. 3 and 4 of the referenced patent. These circuits have the disadvantages of requiring large numbers of components for realization and, in addition, of being sensitive to ambient temperature variations, thus reducing measurement accuracy. Also, the long-term measurement accuracy of these instruments is adversely affected because of changes in the values of sensitive circuit components with age. These instruments leave much to be desired in operator convenience in that each digit of a measurement result must be resolved by the operator. This is accomplished by sequentially adjusting a plurality of switches for null indications on a front panel meter. Considerable measurement time could be saved by providing an instrument capable of automatically calculating and displaying each measurement result. A further shortcoming of these prior art distance measuring instruments is the lack of provision for interfacing them with digital data gathering and calculating units. It would be advantageous to provide a digitally encoded output indication of the results of each distance measurement. This information could be transmitted to a digital storage device to eliminate the need for making a written notation of the measurement results. Such information might also be transmitted to a programmable desk-top calculator which could be programmed to accept the measurement data and directly perform additional calculations involving such data.

Accordingly, it is the principal object of this invention to provide an improved electronic distance measuring apparatus capable of automatically calculating and displaying the result of each distance measurement.

It is a further object of this invention to provide an improved electronic distance measuring apparatus having digital phase comparison circuitry which utilizes a minimum number of components, and whose measurement accuracy and long-term stability are more independent of changes in ambient temperature and variations with time in the values of such components than those units constructed according to the prior art.

It is a further object of this invention to provide an improved electronic distance measuring apparatus having available as an output a binary coded decimal representation of each measurement result.

These objects are accomplished in accordance with the preferred embodiment of this invention by employing a digital control and arithmetic unit and associated logic circuitry to perform a digital time interval measurement of the phase difference between a modulated light signal transmitted to and reflected back from a distant target and that of an internal reference light signal, said signals being time multiplexed.

DESCRIPTION OF THE PREFERRED EMBODIMENT

Figure 1:
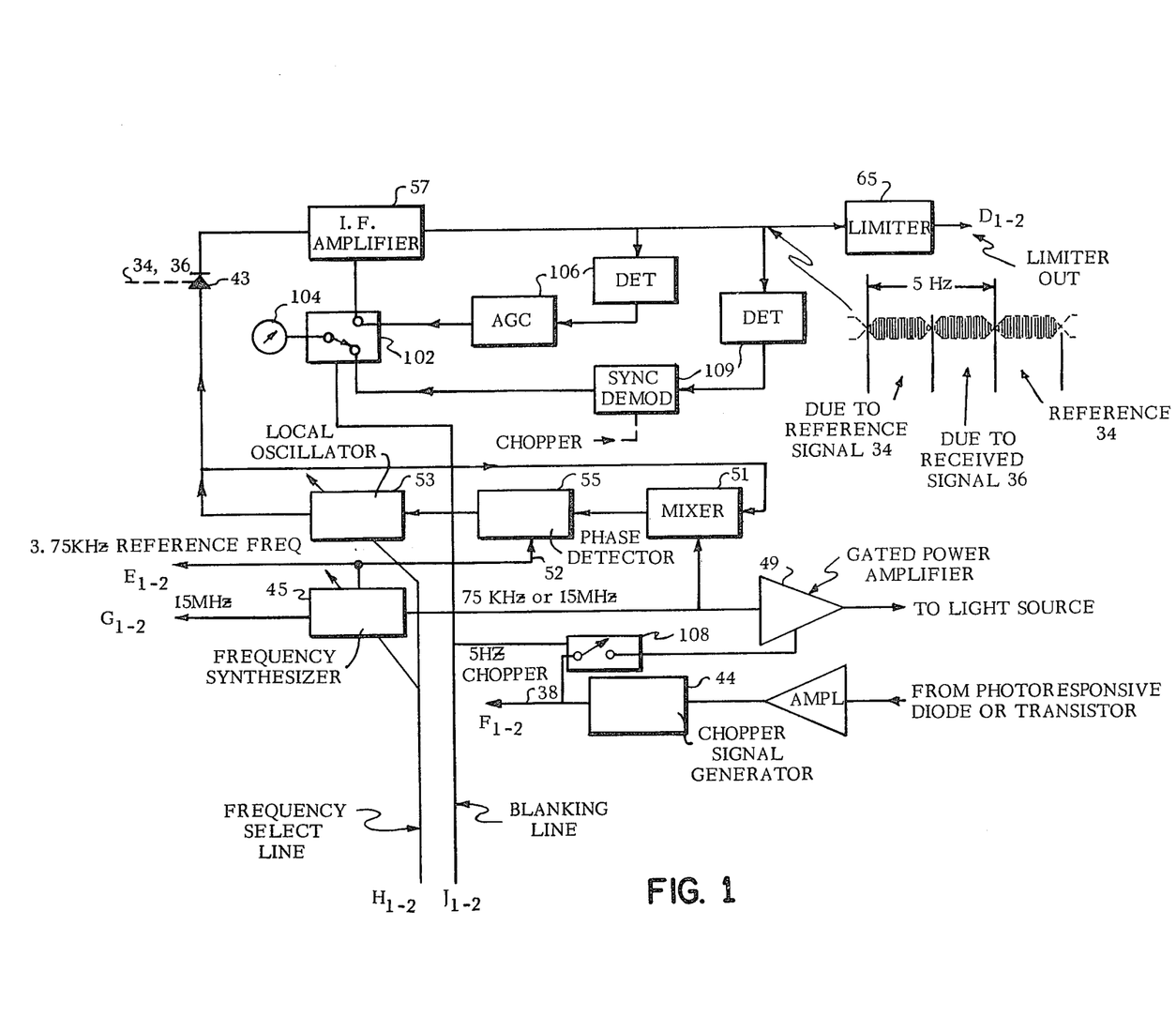
FIG. 1 is a block diagram of the transmitter, receiver, and frequency generation circuitry employed in the present distance measuring instrument.
Figure 2:
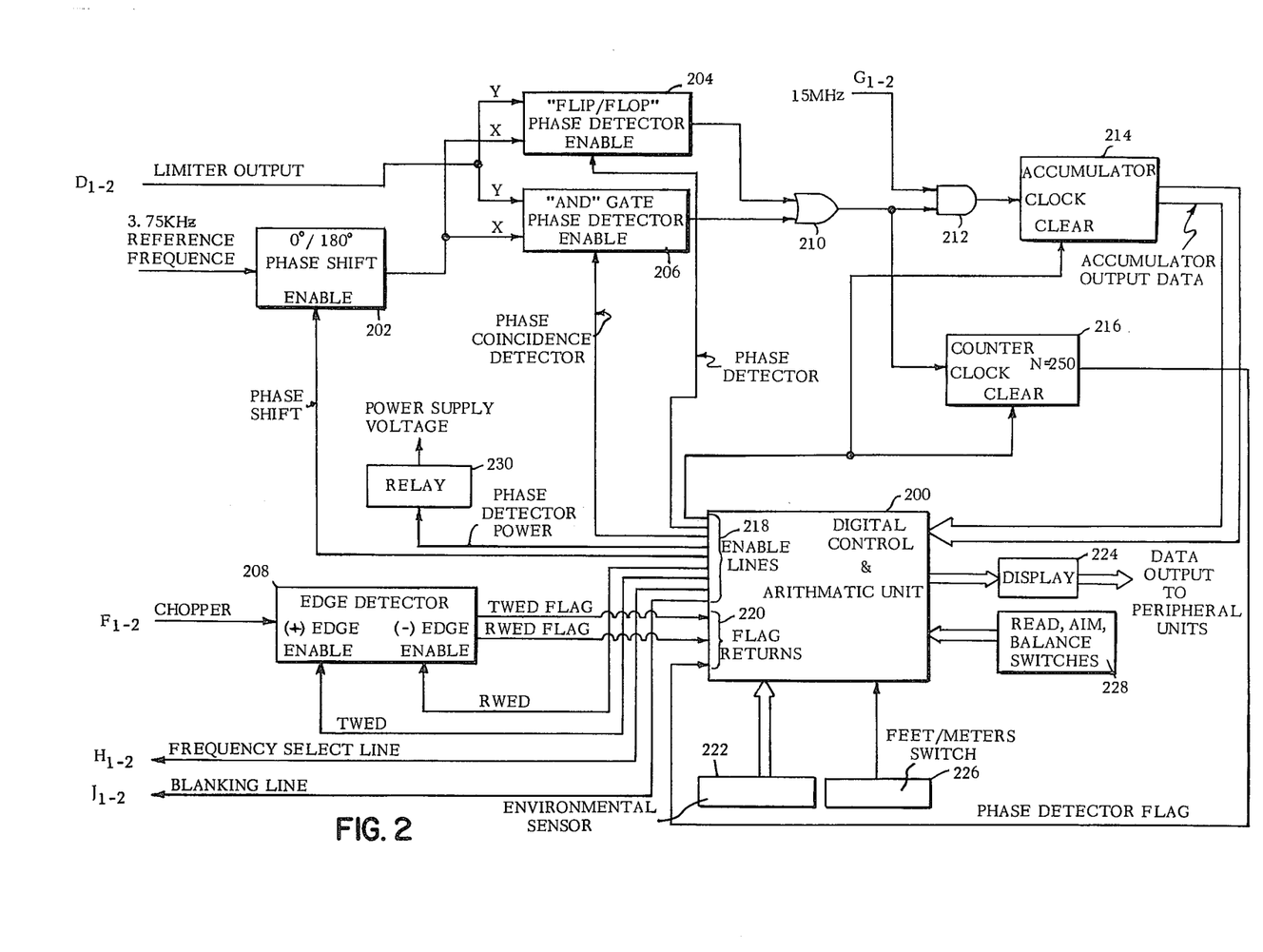
FIG. 2 is a block diagram of the digital phase measurement circuitry employed in the distance measuring instrument.

The overall theory of operation of the present distance measuring instrument is basically as described in columns 1, 2, and lines 1–10 of column 3 of the referenced patent and as shown in FIGS. 1 and 2 thereof. The frequencies at which electroluminescent diode light source 17 is turned on and off are not varied in decade increments as described in column 2, lines 19–23 of the referenced patent. Instead, one of two modulating frequencies, 75 kilohertz or 15 megahertz, is chosen by digital control and arithmetic unit 200 of present FIG. 2. These frequencies do not vary with the measurement system selected. All measurements are made in the metric system and then converted to the English system, if desired, by means of an algorithm contained within digital control and arithmetic unit 200.

The 75 kilohertz modulation frequency corresponds to a modulation wavelength of 4000.0 meters. This in turn corresponds to a measurement wavelength of 2000.0 meters, since the transmitted light signal (target signal) traverses the distance between the instrument and the target reflector twice per cycle. Therefore, by employing the 75 kilohertz modulation mode, a target distance of 2000.0 meters corresponds to 360° of phase shift; 500.0 meters corresponds to 90° of phase shift, etc.

The 15 megahertz modulation frequency results in a measurement wavelength of 10.000 meters. Therefore, a phase shift of 360° occurs for each multiple of 10.000 meters distance between the instrument and the target.

The choice of these two modulation frequencies allows an unambiguous measurement of target distances between zero and 1999.999 meters with a resolution of 0.001 meter. This is accomplished during the automatic measurement operation, discussed in detail below, by first selecting the 2000.0 meter wavelength mode and measuring the phase shift encountered over the measurement path to a resolution of 0.2 meter. Next, the 15 megahertz (10.000 meter wavelength) mode is selected and the target path phase shift is measured. Since the phase shift seen in this mode repeats every 10.000 meters, a measure is obtained of that portion of the target distance between zero and 9.999 meters to a resolution of 0.001 meter. For example, if the target distance to be measured is 472.139 meters, the result of the 75 kilohertz portion of the measurement will be 472.1 meters, while the 15 megahertz mode will yield 2.139 meters. These two measurement components are combined as described below and as shown in detail in the flow chart of FIGS. 4A-F to indicate the resultant 472.139 meters.

Referring again to FIG. 1 of the present application, the two modulation RF frequencies associated with light source 17 (shown in FIG. 1 of the referenced patent) are generated by a frequency synthesizer 45. This frequency synthesizer also supplies a 3.75 kilohertz reference signal 52, as shown in the waveform diagram of FIG. 3. The chosen RF signal from synthesizer 45 is applied to power amplifier 49 for driving light source 17 and is also applied to a mixer 51 where it is combined with the output of a local oscillator 53. This oscillator is controlled by a phase detector 55 which is connected to receive reference frequency 52 and the output of mixer 51 for maintaining the output of oscillator 53 at a frequency which is separated from the frequency of the transmitted RF signal by exactly 3.75 kilohertz.

Figure 3:
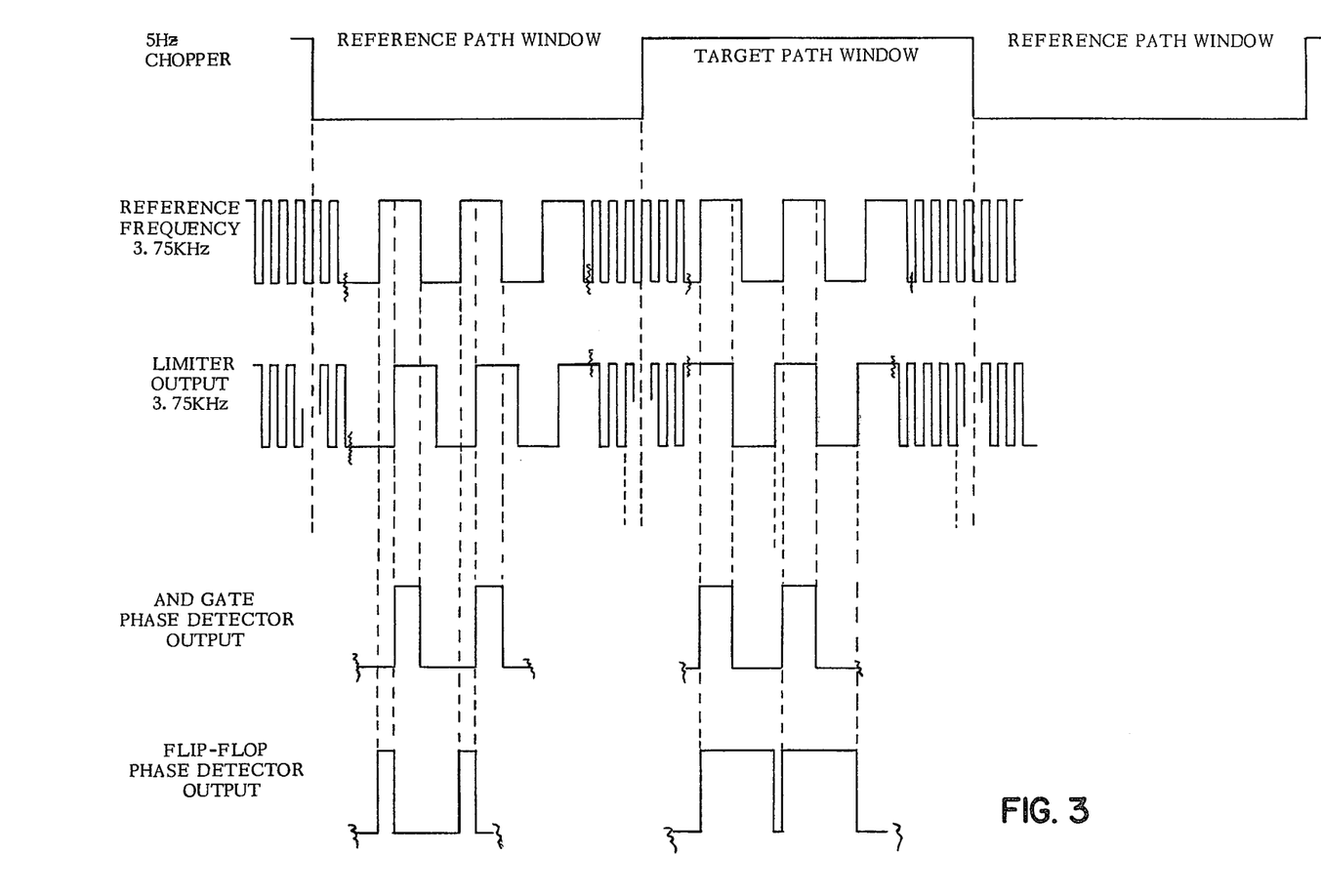
FIG. 3 is a waveform diagram illustrating the timing relationship existing between various ones of the signals of FIGS. 1 and 2.

In the present instrument, a chopper signal generator 44 provides a 5 hertz chopper signal 38 as shown in the waveform diagram of FIG. 3. As described in the referenced patent, the output of an I.F. amplifier 57 changes cyclically and in sequence at the 5 hertz chopper signal rate from the I.F. signal indicative of the detected receiver signal to the I.F. signal indicative of the detected reference signal 34, and so on, with a waveform as shown in FIG. 1 of the present application. The square wave signals appearing at the output of limiter 65 occur at the reference or I.F. frequency of 3.75 kilohertz. In addition, they occur within the half-cycle bursts controlled by a shutter wheel 29 (shown in FIG. 1 of the referenced patent) and contain the relative phase information that is representative of the distance to be measured.

The following circuitry shown in the block diagram of present FIG. 2 is provided to measure, by digital time interval means, the phase separation of these two groups of alternately recurring signals.

A phase shift unit 202 introduces either 0° or 180° of phase shift to the 3.75 kilohertz reference signal, in response to a phase shift enable signal from digital control and arithmetic unit 200.

Chopper signal 38 is applied to an edge detector 208, which determines the beginning of the next occurring complete target path or reference path interval of the chopper signal. As a result, a TWED flag is set in coincidence with the positive edge of the chopper signal while an RWED flag is set in coincidence with the negative edge of the chopper signal. Edge detector 208 issues these flag signals in response to positive and negative edge enable signals from digital control and arithmetic unit 200. The outputs of limiter 65 and phase shift unit 202 are applied to a flip-flop phase detector 204 and an AND gate phase detector 206. Flip-flop phase detector 204 provides an output, which is proportional to the phase difference between its two input signals, in response to an enable signal from digital control and arithmetic unit 200. A requirement associated with flip-flop phase detector 204 is that its output be a logic level pulse waveform with a pulse width which is proportional to the phase difference between the output of phase shift unit 202 and the output of limiter 65. Therefore, the pulse width at the output of flip-flop phase detector 204 is a linear function of the phase difference between its input signals over a range of 0° to 360°, exclusive of the end points. The output waveform of flip-flop phase detector 204 is shown in relationship to its input signals in FIG. 3. AND gate phase detector 206 operates on the same two inputs as detector 204 to provide, in response to another enable signal from digital control and arithmetic unit 200, an output waveform as shown in FIG. 3. A requirement associated with AND gate phase detector 206 is that its output be a logic level pulse waveform with a pulse width that is proportional to the magnitude of the phase difference between the two input signals. Therefore, the pulse width at the output of AND gate phase detector 206 will indicate a maximum duty cycle of 50 percent when the phase difference between its two input signals is 0 and a duty cycle approaching 0 percent for phase differences approaching ± 180°. Both detectors 204 and 206 are constructed so that their outputs will always be related to an integral number of phase comparisons. That is, no partial phase measurements due to random arrival of either of the associated enable signals are allowed. The outputs of detectors 204 and 206 are applied to OR gate 210 and the resultant output is applied, along with a 15 megahertz modulation signal, to AND gate 212. The output of AND gate 212 is clocked into accumulator 214, which comprises a chain of six binary coded decimal decade counters arranged in ripple through configuration. Pulses received at the clock input of accumulator 214 are counted during the portion of time that a clear input is disabled by means of an enable signal from digital control and arithmetic unit 200. The output of accumulator 214, consisting of the parallel connection of the four most significant digits of the six decade counter output lines, is fed to digital control and arithmetic unit 200 for further logic operations in accordance with the flow chart of FIGS. 4A-F. Pulses occurring at the output of OR gate 210 are received at the clock input of a divide-by-250 counter 216 for counting during the portion of time that a clear input is disabled as determined by digital control and arithmetic unit 200. When the 250th pulse has been counted a phase detector flag output is given and returned to the digital control and arithmetic unit. Digital control and arithmetic unit 200 provides both a frequency select enable line and a blanking enable line for controlling various portions of circuitry shown in FIG. 1. The frequency select enable line selects the proper frequencies, as a function of the particular operating mode of the instrument, at which frequency synthesizer 45 and local oscillator 53 are to operate. The blanking line selects the proper function to be indicated by meter 104 during the portion of time the instrument is operating in either an aim or a balance mode.

Digital control and arithmetic unit 200 contains a digital representation of the sequential steps necessary to effect a distance measurement, in accordance with the detailed flow chart of FIGS. 4A-F. The control functions are performed by selecting, in a programmed manner, various ones of the enable lines 218 in response to the information observed on the flag return lines 220. Digital control and arithmetic unit 200 also performs various mathematical operations upon the data received from accumulator 214 and environmental sensor 222 required in calculating the final result of the distance measurement. These mathematical operations are described in detail in the flow chart of FIGS. 4A-F and include arithmetic averaging of iterative measurements in order to attain a high degree of accuracy in the displayed result.

Display unit 224 receives the digitally encoded final result of each measurement for visual display to the operator in either English or metric units, as selected by feet/meters switch 226. Display 224 may comprise, for example, any of a number of the light emitting diode displays commercially available and well known by those skilled in the digital electronics art. The digitally encoded result data is also available for outputting to various peripheral devices such as, for example, a digital computer, calculator, or data storage device.

Environmental sensor 222 comprises a binary coded decimal switch which the operator adjusts according to current environmental conditions of temperature and pressure.

Read, aim, and balance switches 228 are provided for allowing the operator to set up the instrument to make a distance measurement. The aim mode is first used to optically align the distance measuring instrument with the distant reflective target. The balance mode is next used to allow the operator to adjustably equalize the strength of the signal reflected from the target with that of the internal reference signal. Finally, the instrument is placed in the read mode to initiate the sequence of events automatically controlled by digital control and arithmetic unit 200 which results in display to the operator of the measured distance.

Relay 230 is provided to operate in response to a phase detector power signal issued by digital control and arithmetic unit 200 to interrupt power to the measurement circuitry during the period of time the instrument is operating in either the aim or balance mode. This feature considerably extends the life of a portable power supply used to power the instrument in the field.

Figure 4A:
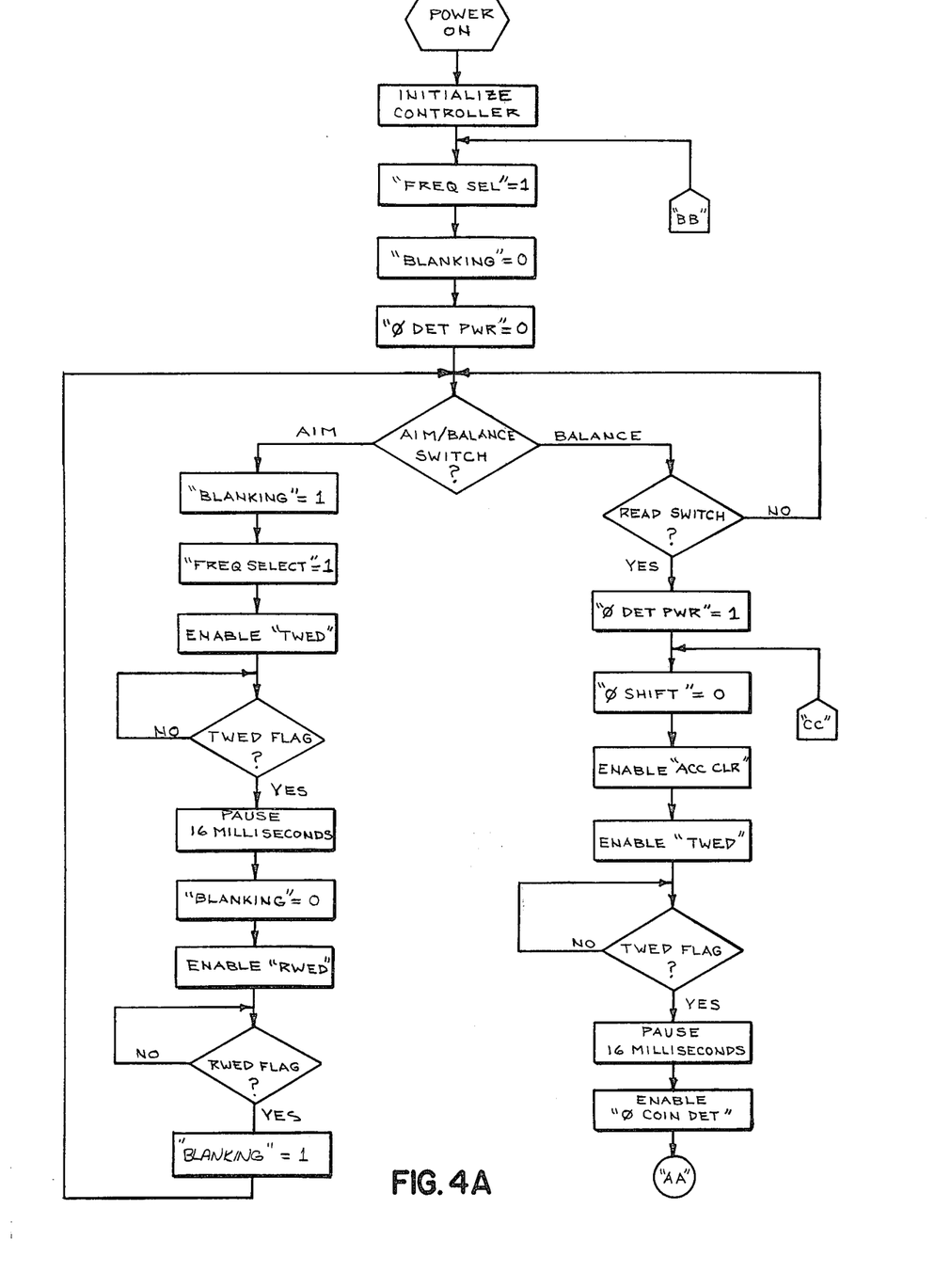
FIGS. 4A-F are a flow chart of the logic operations performed by the digital control and arithmetic unit of FIG. 2.

Referring now to FIGS. 4A-F, there is shown a flow chart of the logic operations performed by digital control and arithmetic unit 200 during the course of a distance measurement. After operating power is applied to the instrument, digital control and arithmetic unit 200 is initialized, and the frequency select, blanking, and phase detector power enable lines are set to the values shown in FIG. 4A. The aim/balance switch is first placed in the aim position to allow the operator to align the instrument with the target for maximum strength of the reflected signal. As shown in FIG. 4A, during the aim operation, the blanking and frequency select enable lines are set to logic state 1. The target window edge detector enable line (TWED) is enabled to allow edge detector 208 to recognize the beginning of the next full target path window, at which time a signal is issued on the TWED flag return line. When the TWED flag is detected, digital control and arithmetic unit 200 pauses to allow disappearance of any transients introduced when the chopper wheel is switching from the reference signal to the target signal. The blanking enable line is then set to logic state 0, which switches meter 104 to indicate reflected signal strength. The reference window edge detector enable line (RWED) is enabled to allow edge detector 208 to recognize the beginning of the next reference path window, at which time a signal is issued on the RWED flag return line. When the RWED flag is detected, the blanking enable line is set to logic state 1 and the above sequence of logic operations associated with the aiming mode is repeated until the operator has adjusted the instrument for maximum reflected signal strength.

Figure 4B:
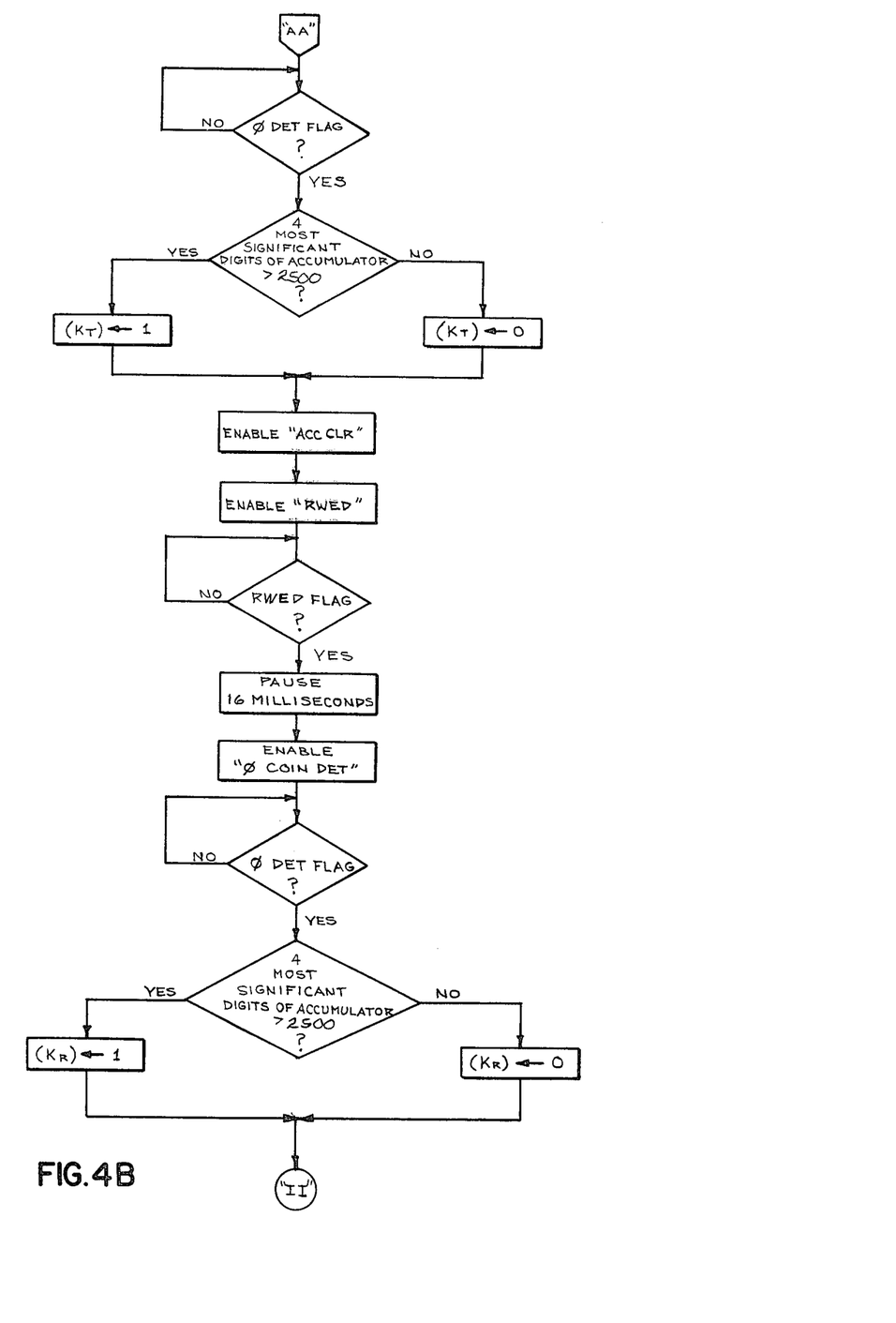

The aim/balance switch is next placed in the balance position to allow the operator to equalize or balance the strength of the reference path signal with that of the target path signal, as indicated by meter 104. When this step has been accomplished, the read switch is placed in the read position to initiate the actual distance measurement. From the point at which the read switch is interrogated, as shown in the right-hand column of FIG. 4A, the measurement proceeds automatically to display the result without the necessity of action on the part of the operator. That is, digital control and arithmetic unit 200 automatically executes all subsequent logic operations to effect the actual distance measurement. Once the read switch has been placed in the read position execution of a series of logic operations comprising a phase coincidence detection cycle is commenced. This cycle determines the approximate phase difference between the limiter output signal and the reference frequency signal. In the event a small phase difference is detected, a 180° phase shift is introduced to the reference frequency signal to avoid phase ambiguity due to the effects of noise, etc. Digital control and arithmetic unit 200 stores the added phase shift for later compensation. This phase coincidence detection cycle is performed during both the target path window and the reference path window. To begin the cycle, the phase detector power enable line is set to logic state 1, which applies operating power to the phase detection circuitry. The phase shift enable line is set to logic state 0, accumulator 214 is cleared, and the target window edge detector enable line (TWED) is enabled. After receiving the TWED flag, digital control and arithmetic unit 200 pauses, as described above, to allow switching transients to disappear. The phase coincidence detector enable line then enables AND gate phase detector 206, which gathers phase comparison data for storage in accumulator 214 during the current target path window. At the end of 250 phase comparisons, a phase detector flag is issued by counter 216. At this point, AND gate phase detector 206 is disabled, and a test is made as shown in FIG. 4B to determine whether the four most significant digits of the data in accumulator 214 are greater than 2500. It should be noted that the data now residing in the accumulator is proportional to the phase difference of the limiter output signal and the reference frequency signal. It can be shown mathematically that if the four most significant digits of the accumulator are greater than 2500, then the magnitude of this phase difference is less than 90°, in which case 180° of phase shift will be introduced for subsequent target path measurements. This condition is noted by setting a register $K_T$, internal to digital control and arithmetic unit 200, to logic state 1. The above described phase coincidence detection cycle is now repeated for the reference path window, as shown in FIG. 4B.

Figure 4C:
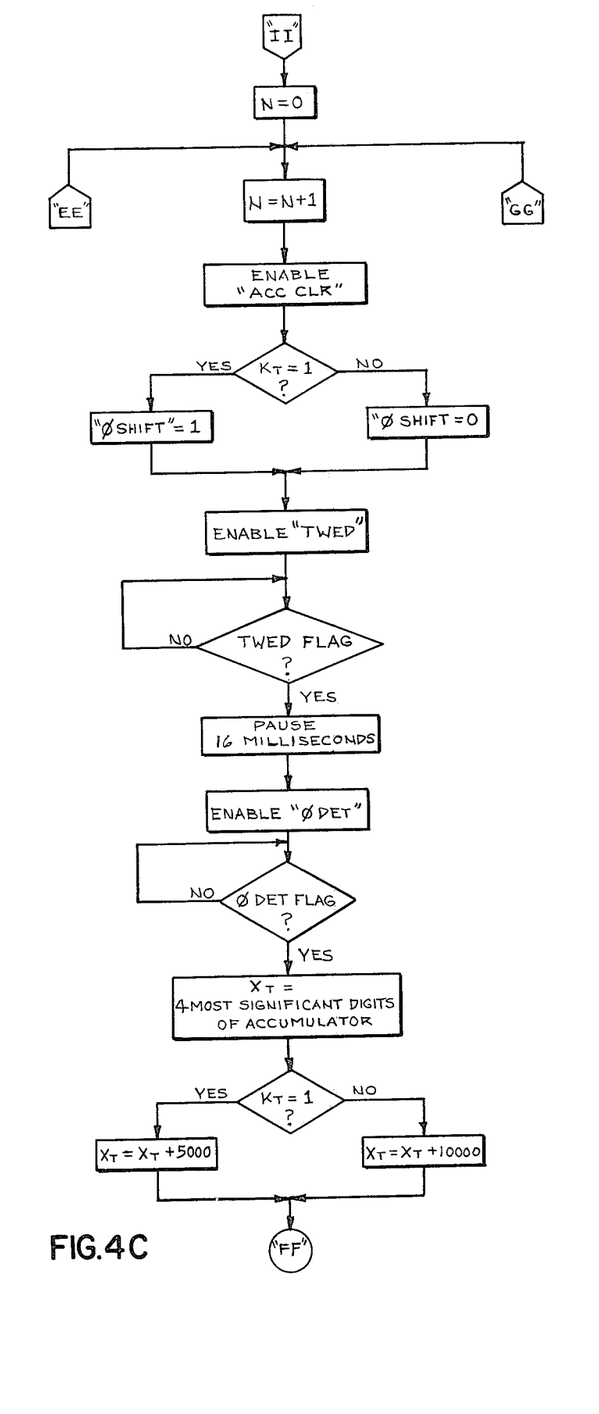

Referring now to FIG. 4C, there is shown the portion of the logic flow chart at which the actual distance measurement begins. The frequency select enable line was set to logic state 1 (75 kilohertz) early in the flow chart and remains in that state at this point. A logic indexing counter internal to digital control and arithmetic unit 200 is set to N=0, where N is the number of phase comparison samples, each sample comprising 250 separate comparisons. This counter is next incremented by unity, accumulator 214 is cleared, and register $K_T$ is interrogated. Depending on the result of this test, either 0° or 180° of phase shift is introduced to the reference frequency signal. The target window edge detector enable line is enabled to allow edge detector 208 to recognize the beginning of the next target path window, at which time a signal is issued on the TWED flag return line. When the TWED flag is detected, the system pauses, as described above, and flip-flop phase detector 204 is enabled by means of a signal on the phase detector enable line. Flip-flop phase detector 204 then executes 250 phase comparisons, resulting in the accumulation of 15 megahertz pulses in accumulator 214, at the end of which time a phase detector flag is issued by counter 216. At this point, flip-flop phase detector 204 is disabled and the four most significant digits of the data in accumulator 214 are transferred to a register $X_T$ in digital control and arithmetic unit 200. Register $K_T$ is next interrogated and the contents of register $X_T$ modified in accordance with the result.

Figure 4D:
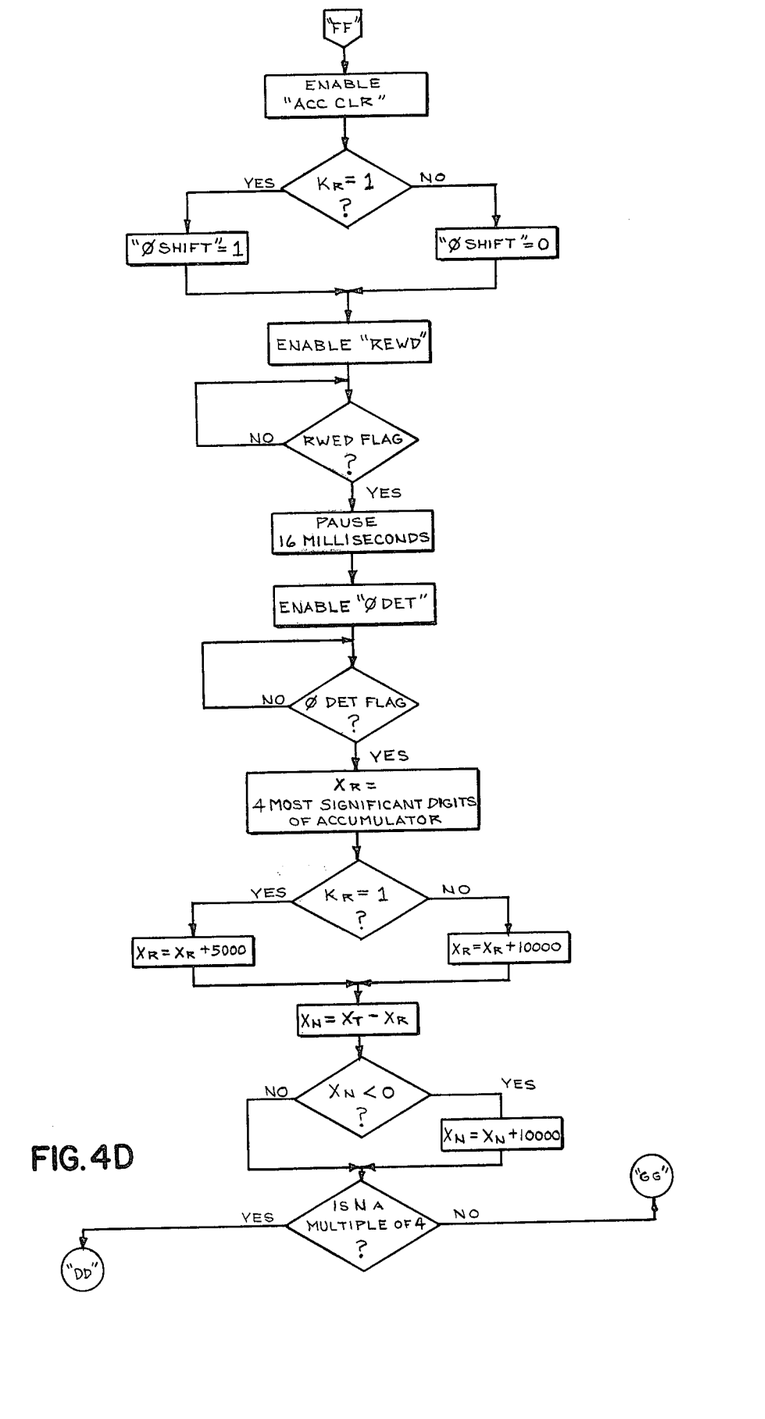
Figure 4E:
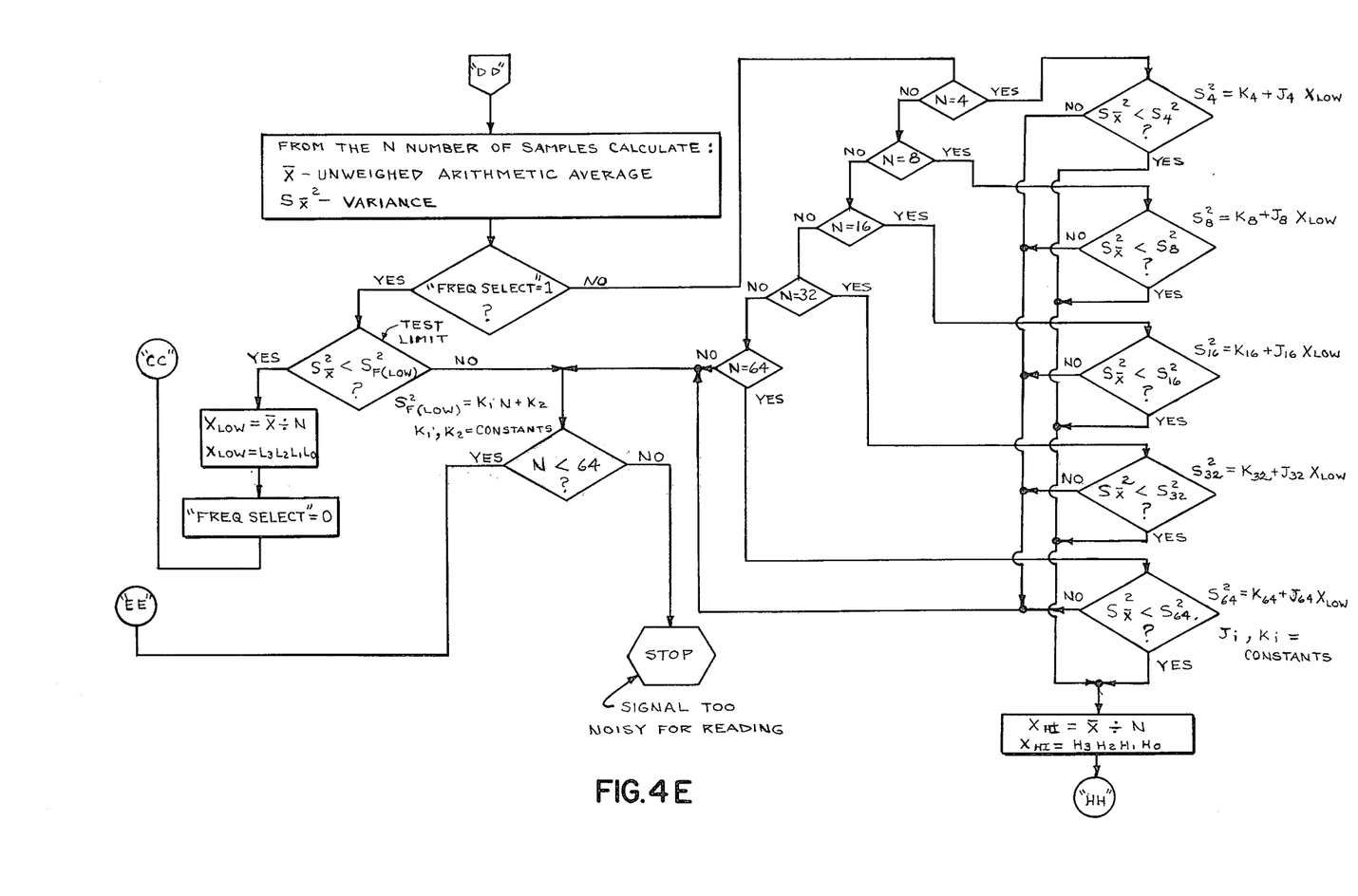

The logic sequence just described is then repeated for the reference path window, as shown in FIG. 4D. The result $X_R$, associated with the reference path window, is next subtracted from the previously calculated and stored target path result $X_T$ to form a quantity $X_N$, which is a measure of the distance in question, subject to a multiplicative constant. For certain combinations of phase relationship between the reference frequency signal, the target path signal, and the reference path signal, $X_N$ may take on negative values, in which case an additive constant of 10,000 is applied to $X_N$. A test is next performed to determine if N is a multiple of 4. If not, an appropriate number of samples of 250 comparisons each is taken. If so, the logic flow continues as shown in FIG. 4E. First, the unweighted arithmetic average, $\overline{X}$, and the statistical variance, $$S\frac{2}{X}$$

of the data from the N samples are calculated. A test is next made to determine the state of the frequency select enable line. Since this line was set to logic state 1, indicating a 75 kilohertz modulation frequency, early in the flow chart and has not since been altered, an affirmative answer to the interrogation will result.

At this point the previously computed statistical variance is compared to an internally stored test limit $S_{F(low)}^2$, selected on the basis of the number of samples N, the desired confidence level, and the required accuracy of the computed measurement result.

If the test limit is not satisfied, a check is made to determine if 64 samples have been taken. If not, additional samples are taken. If so, computation of the measurement is halted, and the operator is notified that measurement conditions are too noisy to yield a measurement within a specified tolerance. The upper limit of 64 samples (16,000 separate phase comparisons) is selected on a statistical basis. If the test limit is satisfied, a register $X_{LOW}$ is set equal to the unweighted arithmetic average $\overline{X}$ divided by the number of samples N, where $X_{LOW}$ is a four-digit number whose digits are labeled $L_0$, $L_1$, $L_2$, $L_3$ in order of increasing significance. This step completes the measurement using the 2000 meter (75 kilohertz) wavelength.

At this point the frequency select enable line is set to logic state 0, thereby selecting the 10 meter wavelength or 15 megahertz modulation frequency. The logic sequence then returns to the designated point shown in FIG. 4A of the flow chart. The measurement logic operations previously executed at the 2000 meter wavelength are repeated at the 10 meter wavelength. These operations continue until the frequency select enable line is interrogated, as shown in FIG. 4E of the flow chart. Since this line is now set to logic state 0, a negative answer to the interrogation results, and logic flow continues as shown in the right-hand portion of FIG. 4E.

A series of decision elements determines whether N is equal to 4, 8, 16, 32, or 64. If not, another data sample is taken until an affirmative answer results at one of these decision elements. When that occurs, a limit test is again performed on the previously computed statistical variance $$S\frac{2}{X}.$$

Each of the internally stored test limits is a function of the previously computed value of $X_{LOW}$ and is of the form $K_I + J_I X_{LOW}$, where $K_I$ and $J_I$ are derived as a function of the maximum tolerable measurement error, using generally known statistical principles. A different test limit is associated with each of the five test values of N because the maximum variance, based on statistics, in the 10 meter wavelength portion of the measurement, is a function of the number of samples N. If the particular test limit in question is not satisfied, additional samples are taken until a test limit is satisfied. In the event a test limit is not satisfied after 64 samples have been taken, the operator is notified that measurement conditions are too noisy to yield a measurement within a specified tolerance. When one of the five test limits has been satisfied, a register $X_{HI}$ is set equal to the unweighted arithmetic average $\overline{X}$ divided by the number of samples N, where $X_{HI}$ is a four-digit number whose digits are labeled $H_0$, $H_1$, $H_2$, $H_3$ in order of increasing significance.

Figure 4F:
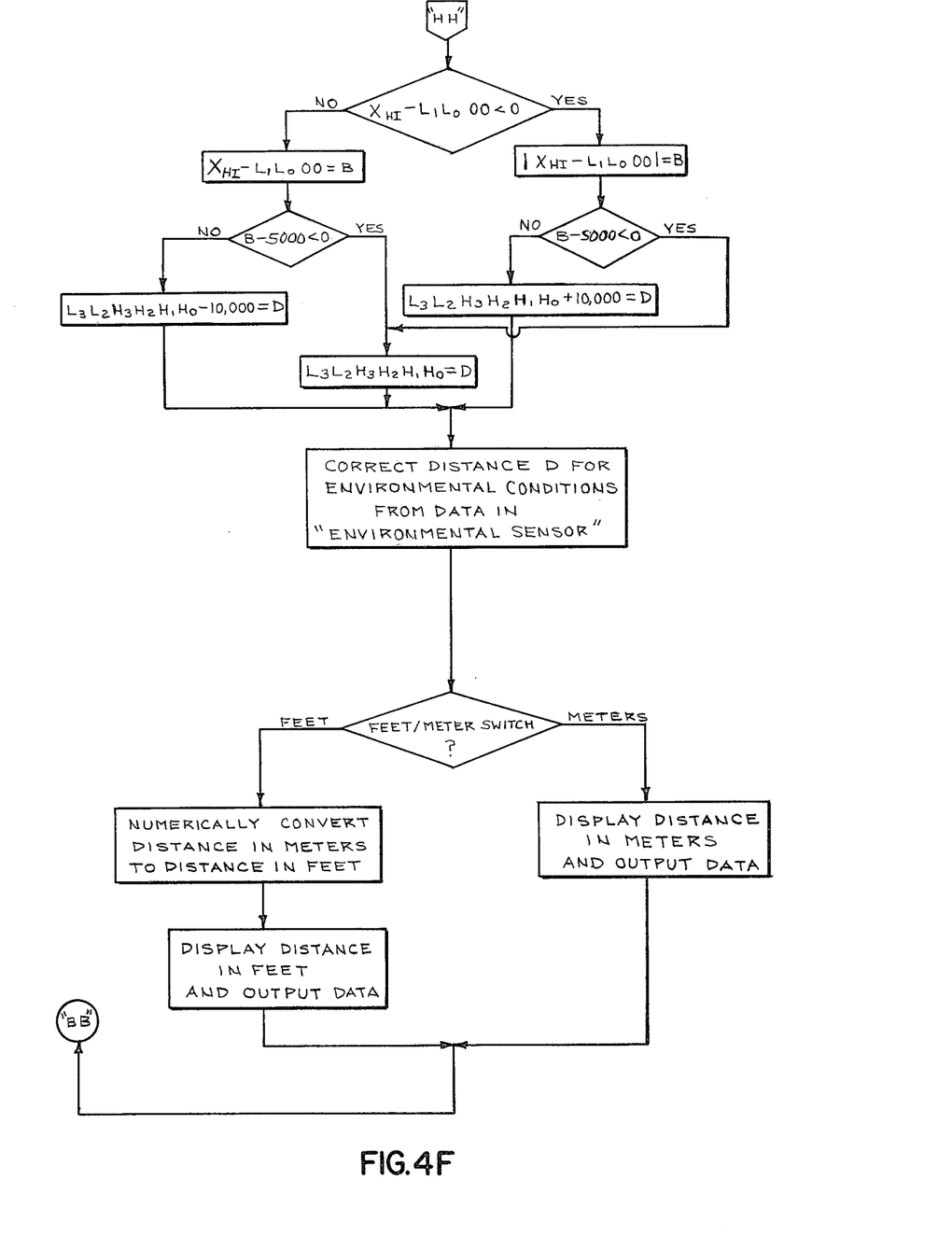

The flow of logic operations continues in FIG. 4F, where the four-digit results $L_3L_2L_1L_0$ of the 2000 meter wavelength portion of the measurement and the four digit result $H_3H_2H_1H_0$ of the 10 meter wavelength portion of the measurement are combined to form the final measurement result, accurate to a few parts per million. In the first step, a four-digit number comprising the digits $0, 0, L_0, L_1$ in order of increasing significance is subtracted from the previously calculated value of $X_{HI}$. If the result of this subtraction is positive, it is labeled B and a test performed to determine if the quantity B-5000 is negative. If so, the final measurement result in millimeters is formed by the digit combination $L_3L_2H_3H_2H_1H_0$. If not, the measurement result in millimeters is formed by the digit combination $L_3L_2H_3H_2H_1H_0$ less 10,000. In the event the earlier subtraction $X_{HI}$-$L_1L_0$00 results in a negative number, the measurement result is formed in only a slightly different manner, as shown in the flow chart of FIG. 4F.

The measurement result thus calculated is next corrected to current environmental conditions of temperature and pressure contained in environmental sensor 222. The resulting distance is then displayed in either feet or meters, as selected by the operator. This same display data is available for output to peripheral data storage and computing units.

Digital control and arithmetic unit 200 then interrogates the aim, balance, and read switches as indicated in FIG. 4A to determine if measurement of the same target distance is to be repeated or to allow the operator to aim the instrument at a different reflective target to make another distance measurement.

As an aid to the reader, there is listed below each of the nine enable lines associated with digital control and arithmetic unit 200, together with the function specified by each of the logic levels 0 and 1 thereon.

1) FREQUENCY SELECT ENABLE LINE
    0   15 megahertz modulation frequency
    1   75 kilohertz modulation frequency
2) BLANKING ENABLE LINE
    0   unblanked operation
    1   blanked operation
3) PHASE DETECTOR POWER ENABLE LINE
    0   power applied to measurement circuitry
    1   power removed from measurement circuitry
4) TARGET WINDOW EDGE DETECTOR ENABLE LINE (TWED)
    0   target window edge detector inactive
    1   target window edge detector enabled
5) REFERENCE WINDOW EDGE DETECTOR ENABLE LINE (RWED)
    0   reference window edge detector inactive
    1   reference window edge detector enabled
6) PHASE SHIFT ENABLE LINE
    0   0° phase shift
    1   180° phase shift
7) ACCUMULATOR CLEAR ENABLE LINE
    0   accumulator clear inactive
    1   accumulator clear enabled
8) PHASE COINCIDENCE DETECTOR ENABLE LINE
    0   AND gate phase detector inactive
    1   AND gate phase detector enabled
9) PHASE DETECTOR ENABLE LINE
    0   flip-flop phase detector inactive
    1   flip-flop phase detector enabled

We claim:

1. Electro-optical distance measuring apparatus of the type including a modulated target path light signal transmitted to and reflected back from a distant target, and an internal reference path light signal continuously and cyclically time multiplexed therewith to provide a time multiplexed signal of fixed frequency having alternating target path and reference path portions, wherein the improvement comprises:

detecting means for separately determining the beginning of a target path portion of said time multiplexed signal and an immediately succeeding reference path portion thereof, and for providing a plurality of pulses, during each of those target path and reference path portions, the number of such pulses being proportional to the phase difference between the reference frequency signal and the respective portions of said time multiplexed signal;

accumulator means connected to said detecting means for separately receiving and counting the plurality of pulses provided by said detecting means during those target path and reference path portions of said time multiplexed signal; and     logic means for combining the counted results of the accumulator means obtained during those target path and reference path portions of said time multiplexed signal to provide an intermediate indication of the phase difference between said target path light signal and said internal reference path light signal, said logic means being operative for enabling said detecting means to repeatedly sample said time multiplexed signal to provide a plurality of pulses, during subsequent target path and immediately succeeding reference path portions thereof, the number of pulses provided during each sample again being proportional to the phase difference between the reference frequency signal and the respective portions of said time multiplexed signal, said logic means being operative to enable said accumulator means to separately receive and count the plurality of pulses provided by said detection means during each of the target and reference path portions of said time multiplexed signal occurring in connection with each such repeated sample, said logic means being operative for combining the counted results of the accumulator means obtained during each of the target and reference path portions of said time multiplexed signal occurring in connection with each such repeated sample to provide a plurality of intermediate indications of the phase difference between said target path light signal and said internal reference path light signal, said logic means being operative for computing the statistical variance of the plurality of intermediate indications of phase difference and for comparing that computed statistical variance with a predetermined test limit to insure a specified degree of measurement accuracy.

2. Electro-optical distance measuring apparatus as in claim 1 further comprising phase coincidence detection means responsive to an indication of small phase difference between said time multiplexed signal and said reference frequency signal at selected times within a measurement cycle for introducing 180° of phase shift to said reference frequency signal to avoid phase ambiguity due to the effects of noise without thereby eliminating that portion of the measurement cycle already completed at the time of introduction of the phase shift.

3. Electro-optical distance measuring apparatus as in claim 1 wherein said logic means is operative for repeatedly sampling said time multiplexed signal until the computed statistical variance of the resulting plurality of intermediate indications of phase difference satisfies said test limit and for apprising the operator of an excessive measurement noise condition if said test limit is not satisfied after a predetermined number of samples.

4. Electro-optical distance measuring apparatus as in claim 3 wherein said test limit is computed as a function of the number of repeated samples of said time multiplexed signal, a desired confidence level, and a required degree of accuracy of the measurement result.

* * * * *